(12) United States Patent
Yamamoto (10) Patent No.: US 8,376,110 B2
(45) Date of Patent: Feb. 19, 2013

(54) BICYCLE HUB ASSEMBLY

(75) Inventor: Takashi Yamamoto, Sakai (JP)

(73) Assignee: Shimano Inc., Osaka (JP)

( * ) Notice: Subject to any disclaimer, the term of this patent is extended or adjusted under 35 U.S.C. 154(b) by 583 days.

(21) Appl. No.: 12/684,658

(22) Filed: Jan. 8, 2010

(65) Prior Publication Data
US 2011/0168511 A1   Jul. 14, 2011

(51) Int. Cl.
*B62M 6/65* (2010.01)
*F16D 41/24* (2006.01)
(52) U.S. Cl. .............. 192/64; 192/48.92; 180/206.6; 301/110.5
(58) Field of Classification Search .......... 192/64; 475/8; 180/206.1, 206.2, 206.6, 206.7
See application file for complete search history.

(56) References Cited

U.S. PATENT DOCUMENTS

| 5,322,487 A | 6/1994 | Nagano | |
|---|---|---|---|
| 6,533,700 B2 * | 3/2003 | Shoge | 475/275 |
| 7,148,582 B2 * | 12/2006 | Matsueda et al. | 290/1 C |
| 2006/0287151 A1 * | 12/2006 | Takeda et al. | 475/5 |
| 2008/0227588 A1 * | 9/2008 | Urabe | 475/297 |
| 2009/0203490 A1 * | 8/2009 | Fukui et al. | 475/297 |
| 2011/0009231 A1 * | 1/2011 | Shoge et al. | 475/297 |

FOREIGN PATENT DOCUMENTS

| EP | 1 595 783 A2 | 11/2005 |
|---|---|---|
| EP | 1 736 399 A1 | 12/2006 |
| EP | 1 947 003 A1 | 7/2008 |
| JP | 3460903 B2 | 10/2003 |

* cited by examiner

*Primary Examiner* — Richard M. Lorence
(74) *Attorney, Agent, or Firm* — Global IP Counselors, LLP (57) ABSTRACT

A hub shell of a hub assembly is rotatable about a fixed hub shaft. A power transmitting member is disposed within the hub shell. A pawl supporting member has at least one pawl member movable between an active position where the pawl member allows transmission of rotary power from the hub shell to the power transmitting member and an inactive position decoupling the pawl from one of the power transmitting member and the hub shell. A one way roller clutch assembly is coupled between the power transmitting member and the hub shell and is movable between an active position where the roller clutch assembly couples the power transmitting member to the hub shell to transmit rotary power from the power transmitting member to the hub shell and an inactive position decoupling the power transmitting member from the hub shell.

11 Claims, 9 Drawing Sheets

BICYCLE HUB ASSEMBLY

BACKGROUND

1. Field of the Invention

This invention generally relates to a bicycle hub assembly of a motor assist bicycle. More specifically, the present invention relates to bicycle hub assembly with a battery powered electric motor that provides supplemental rotary motion to power the bicycle and where the motor also operates as an electricity producing generator in a regenerative function to re-charge the battery and provide regenerative braking.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

In most bicycles, the cyclist provides all the energy for bicycle motion. Specifically, the cyclist uses the pedals and crank arms of the bicycle to provide rotary motion. Alternatively, some bicycle models include a motor assist arrangement, where the pedaling action of the cyclist is supplemented by rotary power provided by an electric motor. Typically, the electric motor is powered by a re-chargeable battery. Still further, some bicycles with a motor assist arrangement also include a regenerative function where rotation of the wheels causes the motor to rotate. Rotation of the motor causes the motor to operate as an electric generator producing electricity to re-charge the battery and creates drag on rotation of the wheels thus providing regenerative braking.

SUMMARY

One aspect is to provide a bicycle with regenerative function with means to selectively engage and disengage the regenerative function.

In view of the state of the known technology, a bicycle hub assembly includes a fixed hub shaft, a hub shell, a power transmitting member, a pawl supporting member and a one way roller clutch assembly. The hub shell is operably coupled to the fixed hub shaft for rotation about the fixed hub shaft. The power transmitting member is disposed within the hub shell. The pawl supporting member has at least one pawl member that is selectively movable between an active position and an inactive position. In the active position, the pawl member allows transmission of rotary power from the hub shell to the power transmitting member. In the inactive position, the pawl member is decoupled from one of the power transmitting member and the hub shell. The one way roller clutch assembly is coupled between the power transmitting member and the hub shell and movable between an active position and an inactive position. In the active position, the roller clutch assembly couples the power transmitting member to the hub shell to transmit rotary power from the power transmitting member to the hub shell. In the inactive position, the roller clutch assembly decouples the power transmitting member from the hub shell.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
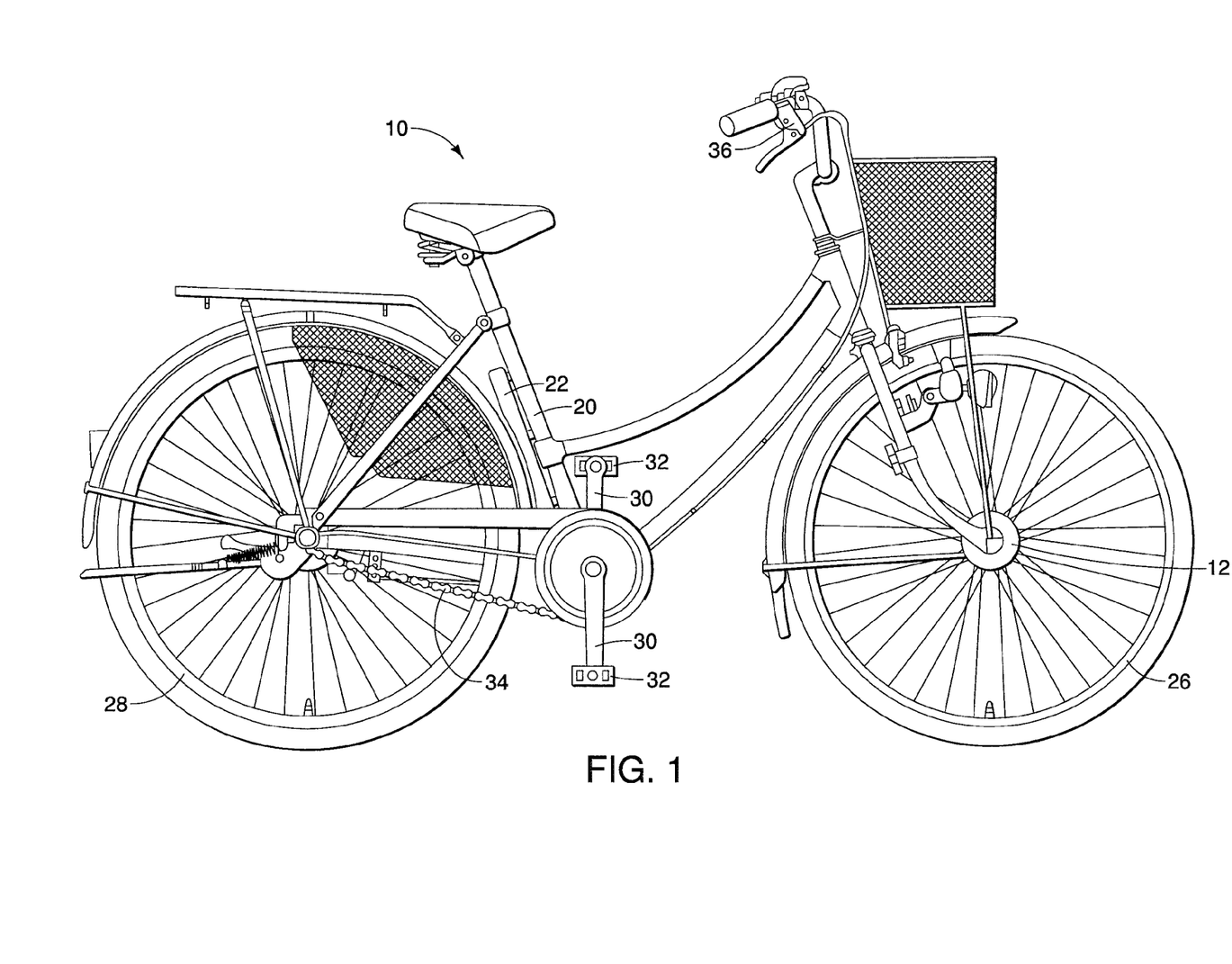
FIG. 1 is a side elevational view of a bicycle that includes a hub assembly with an electric motor in accordance with a first embodiment.

Referring initially to FIG. 1, a bicycle 10 is illustrated with a hub assembly 12 in accordance with a first embodiment.

The bicycle 10 basically includes frame 20, a battery 22, a front wheel 26, a rear wheel 28, crank arms 30 with pedals 32, a chain 34, control levers 36 and the hub assembly 12 (a front wheel hub assembly) that includes an electric motor 48 (described in greater detail below with respect to FIG. 2).

The bicycle 10 is configured such that a cyclist can ride the bicycle 10 in a conventional manner, using the pedals 32 and the crank arms 30 to power the bicycle 10. The bicycle 10 is also configured with a motor assist feature, where rotary motion is provided by, for example, the motor 48 powered by the battery 22. The bicycle 10 also includes a regenerative function. Specifically, when the bicycle 10 is coasting (the cyclist is not pedaling and the motor 48 is not operating to provide rotary motion to the bicycle 10), rotation of the wheel 26 is used produce electricity to recharge the battery 22.

Various portions of the bicycle 10 are conventional and therefore description of those portions is omitted for the sake of brevity. Specifically, the frame 20, the battery 22, the rear wheel 26, the front wheel 28, the crank arms 30, the pedals 32, the chain 34 and the control levers 36 are all conventional features. Therefore, description of those features is omitted for the sake of brevity.

The regenerative feature or regenerative function of the bicycle 10 is now briefly described. When the bicycle 10 is powered with motor assist, the motor 48 in the hub assembly 12 provides rotary power to the wheel 26. Specifically, the motor 48 transmits rotary power via the hub assembly 12 to the front wheel 26. When the bicycle 10 is coasting, rotation of the front wheel 26 causes the motor 48 within the hub assembly 12 to convert rotary motion into electricity. More specifically, the motor 48 in the hub assembly 12 serves as an electricity producing device that re-charge the battery 22. Thus, the power of the battery 22 is regenerated as the battery 22 is re-charged. Further while producing electricity, the motor 48 creates drag on the front wheel 26, proving regenerative braking.

In a conventional bicycle with regenerative features, the regenerative function is constant when the bicycle is coasting. In the present invention, the hub assembly 12 is configured to selectively engage and disengage the regenerative function, as is described in greater detail below.

Figure 2:
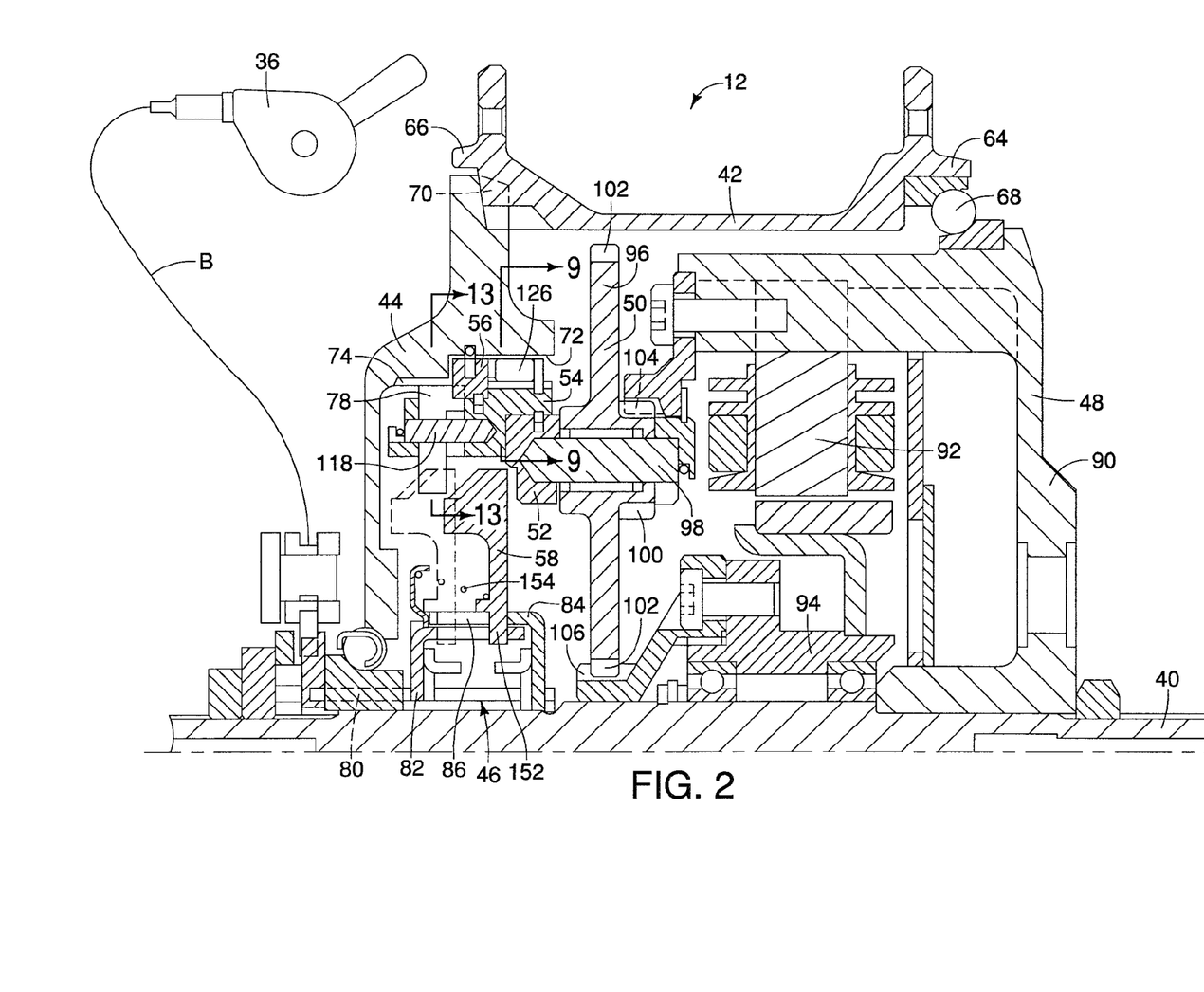
FIG. 2 is a cross-sectional view of the bicycle hub assembly of a front wheel showing an electric motor, a power transmitting member, a pawl supporting member, a one way roller clutch, a hub shell and a pawl control member, the pawl control member shown in solid lines in a regeneration ON position allowing a pawl of the pawl supporting member to move between an engaged position and a dis-engaged position, and the pawl control member shown in dashed lines in regeneration OFF position that retains the pawls of the pawl supporting member in the dis-engaged position in accordance with the first embodiment.

A description of the hub assembly 12 is now provided with initial reference to FIG. 2. The hub assembly 12 is installed at the center of the front wheel 26. The hub assembly 12 basically includes a fixed hub shaft 40, a hub shell 42, a hub shell end portion 44, a operating mechanism 46, the motor 48, a planetary gear section 50, a power transmitting member 52, a pawl supporting member 54, a one way roller clutch assembly 56 and a pawl control member 58.

The fixed hub shaft 40 is fixed to a front fork of the bicycle as indicated in FIG. 1. Consequently, the fixed hub shaft 40 does not rotate. Rather, the hub shell 42 is operably coupled to the fixed hub shaft 40 for rotation about the fixed hub shaft 40.

The hub shell 42 has a first axial side 64 and a second axial side 66. The first axial side 64 is dimensioned to support a bearing assembly 68. The bearing assembly 68 is supported on a portion of the motor 48, as indicated in FIG. 2. The second axial side 66 is connected to the hub shell end portion 44 for rotation therewith.

Figure 6:
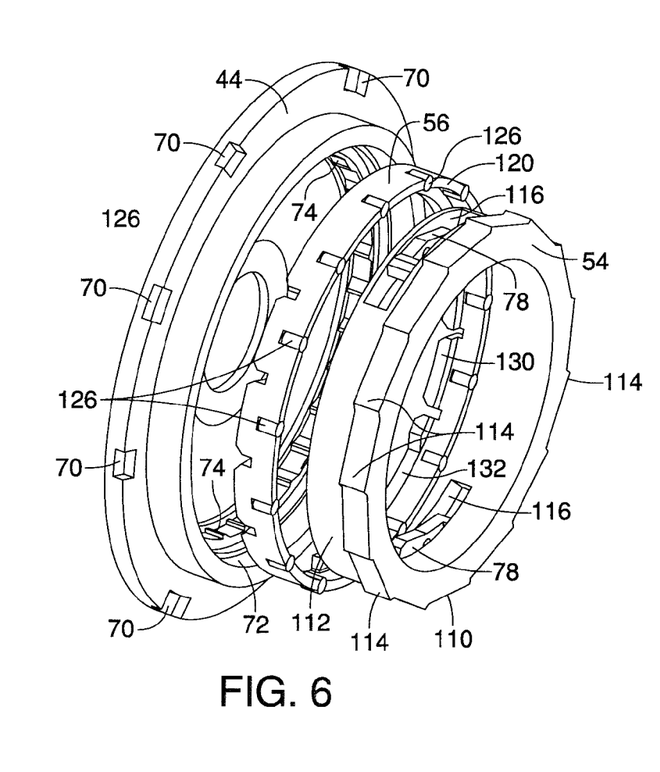
FIG. 6 is an exploded view of a portion of the bicycle hub assembly showing features of an end cap member of the hub shell, the one way roller clutch and the pawl supporting member in accordance with the first embodiment.

The hub shell end portion 44 is a disk shaped member that is best shown in FIG. 6. The hub shell end portion 44 includes a hub shell engaging section 70, a roller clutch engaging surface 72 and ratchet teeth 74. The hub shell engaging section 70 is shaped to engage the hub shell 42 such that the hub shell 42 and the hub shell end portion 44 rotate together as a single unit. The roller clutch engaging surface 72 is an annular shaped surface that is dimensioned to selectively engage the one way roller clutch assembly 56, as described in greater detail below. The ratchet teeth 74 are dimensioned for engagement with pawls 78 of the pawl supporting member 54, as described in greater detail below.

Figure 3:
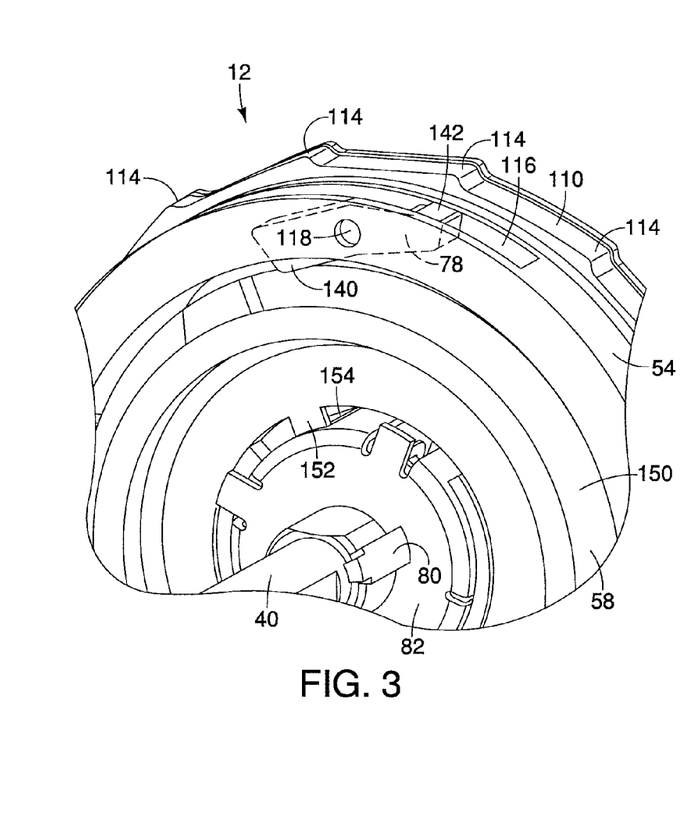
FIG. 3 is a perspective view of the pawl supporting member and the pawl control member shown removed from the hub shell, showing the pawl control member in the regeneration OFF position retaining the pawl in the disengaged position in accordance with the first embodiment.
Figure 4:
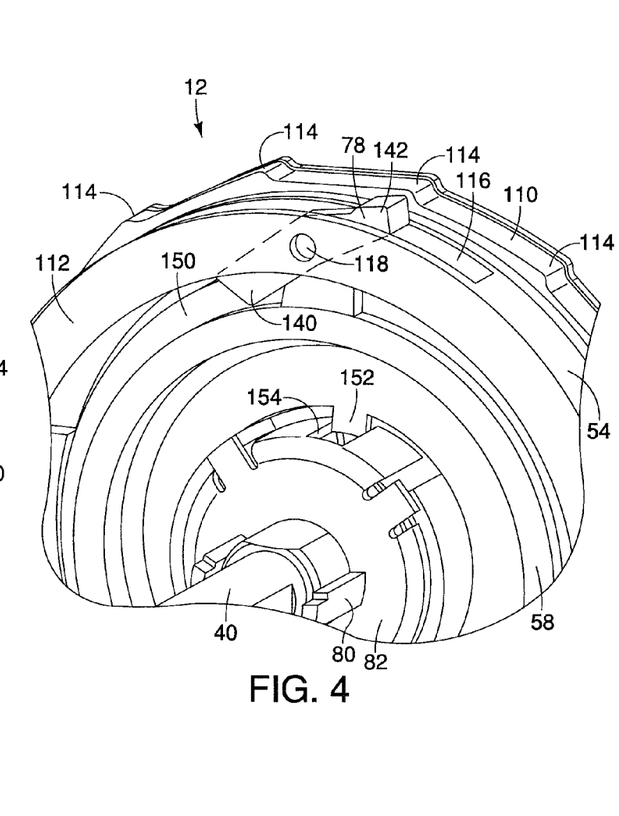
FIG. 4 is another perspective view of the pawl supporting member shown removed from the hub shell similar to FIG. 3, showing the pawl control member in the regeneration ON position allowing the pawl to move to the engaged position in accordance with the first embodiment.

The operating mechanism 46 is a conventional mechanism that is operated by one of the control levers 36 in a conventional manner. More specifically, when the control lever 36 is moved, a Bowden-type cable B transmits motion to a sleeve member 80. Consequently, the sleeve member 80 can undergo limited rotation about the fixed hub shaft 40, as indicated in FIGS. 3 and 4. The sleeve member 80 is mechanically connected to a control member 82 (shown in FIGS. 2-5). Rotation of the sleeve member 80 causes the control member 82 to undergo corresponding limited rotation about the fixed hub shaft 40. A cam member 84 (shown in FIGS. 2 and 5) having a cam surface 86 (shown in FIG. 5) is non-rotatably fixed to the fixed hub shaft 40. The cam member 84 is positioned such that as the control member 82 rotates, a portion of the pawl control member 58 contacts the cam surface 86 causing the pawl control member 58 to move in an axial direction relative to the fixed hub shaft 40, as is described in greater detail below. Function of similar operating mechanism having a sleeve member such as the sleeve member 80, a control member such as the control member 82 and a cam member such as the cam member 84 is described in greater detail in, for example, U.S. patent application Ser. No. 12/624,895, filed Nov. 24, 2009 and U.S. Pat. No. 5,322,487, issued Jun. 21, 1994. Therefore, further description of the operating mechanism 46 is omitted for the sake of brevity.

The motor 48 is a conventional electric motor that is mounted to the fixed hub shaft 40, as shown in FIG. 2. The motor 48 includes a mounting section 90, a stator section 92 and a rotor section 94. The mounting section 90 of the motor 48 is fixed to the fixed hub shaft 40. The coil section 92 extends from the mounting section 90 such that the stator section 92 is disposed within the hub shell 42.

The planetary gear section 50 includes a plurality of plurality of planetary gears 96 (only one shown) that rotate about shafts 98. The shafts 98 are supported by the power transmitting member 52. The planetary gears 96 include inner gear teeth 100 and outer gear teeth 102. The inner gear teeth 100 mesh with gear teeth 104 on the stator section 92 of the motor 48. The outer gear teeth 102 mesh with gear teeth 106 on the rotor section 94 of the motor 48, as shown in FIG. 2.

When the motor 48 operates, the stator section 92 causes the rotor section 94 to rotate about the fixed hub shaft 40. The rotor section 94 causes the planetary gears 96 to rotate about the shafts 98. The shafts 98 then cause the power transmitting member 52 to rotate about the fixed hub shaft 40.

The power transmitting member 52 is an annular member that is fixed by fasteners (not shown) or other mechanical attachment configurations to the pawl supporting member 54. The power transmitting member 52 also includes a conventional planetary gear support section that supports the shafts 98 of the planetary gears 96.

As best shown in FIG. 3-6, the pawl supporting member 54 is an annular ring shaped member that includes a cam section 110 and a pawl support section 112. Both the cam section 110 and the pawl support section 112 are annular shaped and unitarily formed as a single element. The cam section 110 includes a plurality of protrusions on an outer radial side thereof that define cam surfaces 114, as best shown in FIG. 6. The pawl support section 112 includes two recesses 116 with the pawls 78 disposed in the recesses 116. The pawls 78 are pivotally supported within the recesses 116 by pivot shafts 118 (shown in FIGS. 2, 3 and 4). More specifically, the pivot shafts 118 extend through the pawls 78 and allow the pawls 78 to freely pivot. A further description of the cam surfaces 114 is provided below after a description of the one way roller clutch assembly 56. In the depicted embodiment, two pawls 78 are shown. However, it should be understood from the drawing and the description herein that more than two pawls 78 can be included.

Figure 7:
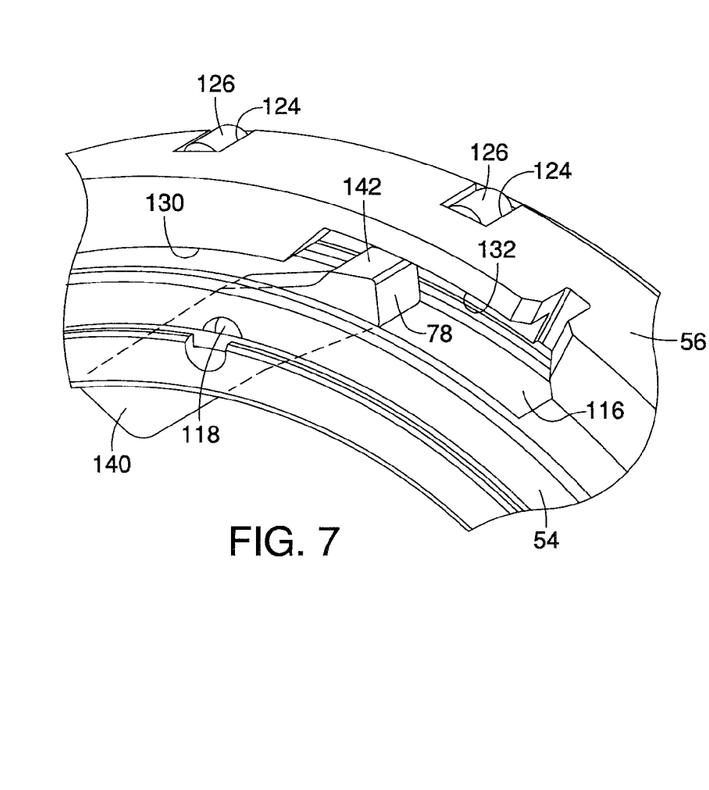
FIG. 7 is a perspective of a portion of the bicycle hub assembly showing a cam projection and a recess of the one way roller clutch along with the pawl supporting member, with recess positioned to allow the pawl to move to the engaged position in accordance with the first embodiment.
Figure 8:
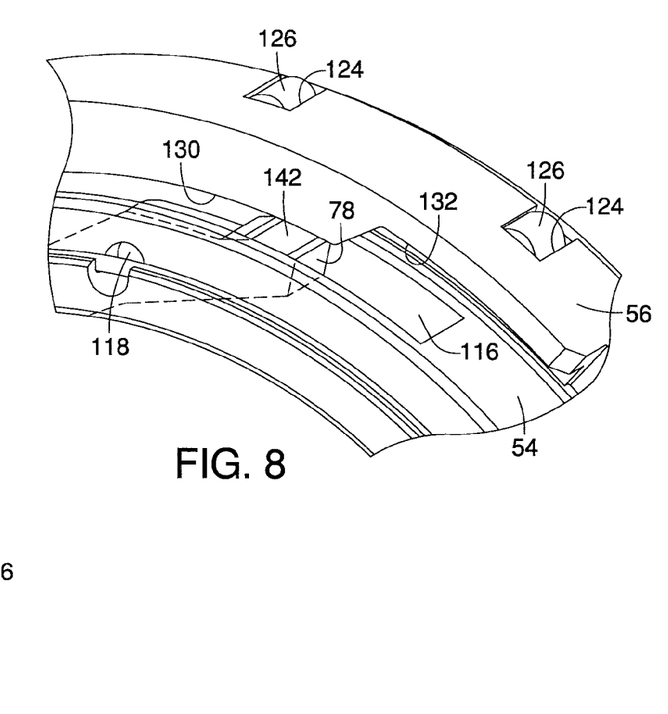
FIG. 8 is a perspective of a portion of the bicycle hub assembly similar to FIG. 7 showing the cam projection positioned to move the pawl to the dis-engaged position in accordance with the first embodiment.

As best shown in FIG. 6, the one way roller clutch assembly 56 is an annular shaped member that includes a roller support section 120 and a cam section 122. The roller support section 120 includes a plurality of recesses 124 that retain a corresponding plurality of rollers 126, with one roller 126 disposed in each recess 124. The cam section 122 includes a plurality of cam projections 130 that extend radially inward and a plurality of recesses 132 adjacent to the cam projections 130, as best shown in FIGS. 7 and 8. The spacing and positioning of the recesses 132 and the cam projection 130 corresponds to relative locations of the pawls 78, as is described in greater detail below.

As shown in FIG. 2, the cam section 110 (an annular section) of the pawl supporting member 54 extends within the roller supporting section 120 (an annular portion) of the one way roller clutch assembly 56. Further, the rollers 126 (roller clutch elements) are disposed between the roller clutch engaging surface 72 (a portion of the hub shell 42) and the cam section 110 of the pawl supporting member 54.

As best shown in FIGS. 7 and 8, each of the pawls 78 includes a control end 140 and a locking end 142. The pivot shaft 118 extends through an aperture in the pawl 78 that is locate approximately midway between the control end 140 and the locking end 142. The pawls 78 are dimensioned to pivot between a dis-engaged position shown in FIGS. 3, 8, 13 and 14 and an engaged position shown in FIGS. 4, 7, 15 and 16. The pawls 78 are biased by a spring (not shown) toward the engaged position shown in FIGS. 4, 7, 15 and 16.

Figure 5:
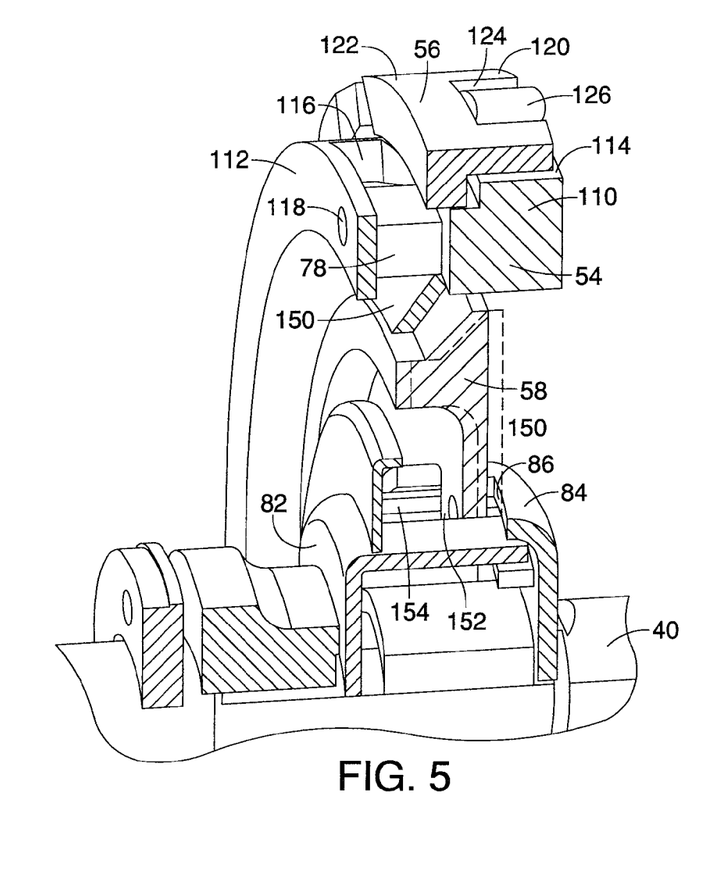
FIG. 5 is a cross-sectional view of a portion of the bicycle hub assembly, showing a fixed hub shaft, portions of the pawl control member, the pawl supporting member and the one way roller clutch with the hub shell removed for clarity, with the pawl control member shown in dashed lines in the regeneration ON position allowing the pawls of the pawl supporting member to move between the engaged position and the dis-engaged position, and the pawl control member shown in solid lines in the regeneration OFF position that retains the pawls of the pawl supporting member in the dis-engaged position in accordance with the first embodiment.

A description is now provided for the pawl control member 58 with initial reference to FIGS. 2-5. The pawl control member 58 is an annular member that encircles the fixed hub shaft 40. The pawl control member 58 is disposed radially within the pawl supporting member 52 and the one way roller clutch assembly 56, as best shown in FIG. 5. The pawl control member 58 includes a cam surface 150 that has a conical shape when viewed in cross-section (see FIGS. 2 and 5). The pawl control member 58 also includes a plurality of radially inwardly extending projection 152 that extend into corresponding slots 154 of the control member 82, as best shown in FIGS. 3, 4 and 5.

The pawl control member 58 is configured to undergo limited rotation about the fixed hub shaft 40 in response to movement of the operating mechanism 46. Specifically, when the sleeve member 80 is moved in response to operation of one of the control levers 36, movement of the sleeve member 80 causes the control member 82 to rotate. Rotation of the control member 82 causes the pawl control member 58 to undergo corresponding rotation. As the pawl control member 58 rotates, the projection 152 of the pawl control member 58 contacts the cam surface 86 of the fixed cam member 84. Contact with the cam surface 86 causes the pawl control member 58 to move between a regeneration OFF position (an inactive position) depicted in FIG. 3 and a regeneration ON position (an active position) depicted in FIG. 4.

Operation of the pawl supporting member 54, one way roller clutch assembly 56 and the pawl control member 58 is now provided with specific reference to FIGS. 9-16.

The one way roller clutch assembly 56 is coupled between the power transmitting member 52 and the hub shell 42 and is movable between an active position where the one way roller clutch assembly 56 couples the power transmitting member 52 to the hub shell 42 to transmit rotary power from the power transmitting member 52 to the hub shell 42 and an inactive position decoupling the power transmitting member 52 from the hub shell 42.

Figure 9:
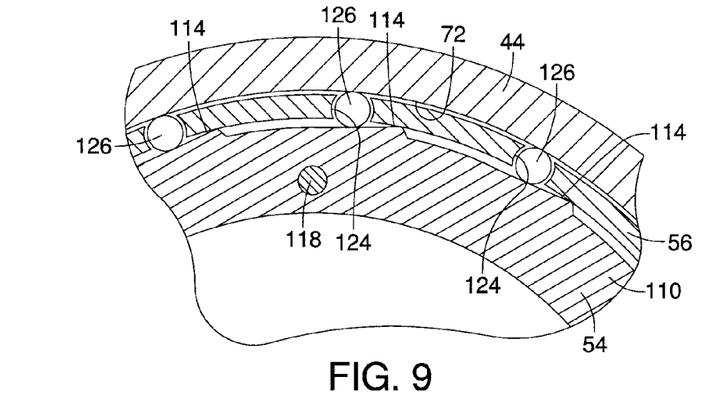
FIG. 9 is a cross-sectional view taken along the line 9-9 in FIG. 2, showing a section of the one way roller clutch, a section of the pawl supporting member and a section the end cap member of the hub shell in a first position relative to one another, showing the one way roller clutch in an engaged position for transmission of rotary power from the motor to the hub shell in accordance with first embodiment.
Figure 13:
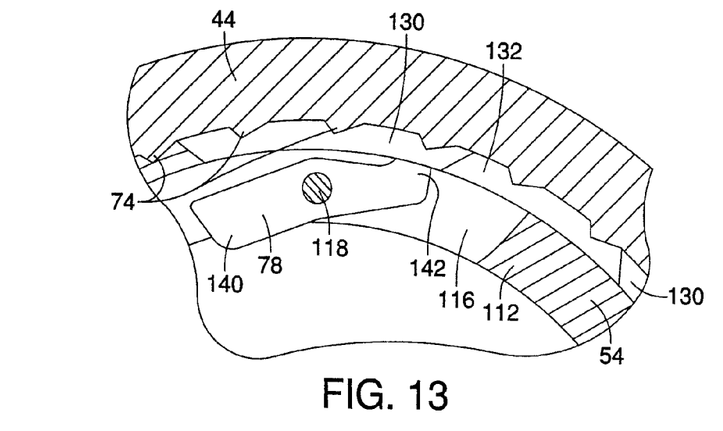
FIG. 13 is a cross-sectional view taken along the line 13-13 in FIG. 2, showing another section of the end cap member of the hub shell, another section of the one way roller clutch, and another section of the pawl supporting member in the first position relative to one another corresponding to the relative positions depicted in FIG. 9, showing the pawl moved to the dis-engaged position by contact with the cam projection of the one way roller clutch in accordance with first embodiment.

During cycling of the bicycle 10, the pedaling work done by the cyclist is assisted by the motor 48 in the hub assembly 12. When the motor 48 is providing power to the front wheel 26, rotary power is transmitted through the planetary gear section 50 to the power transmitting member 52. Rotary power is then transmitted from the power transmitting member 52 to the pawl supporting member 54. Rotation of the pawl supporting member 54 causes the cam surfaces 114 to urge the rollers 126 into engagement with the roller clutch engaging surface 72 of the hub shell end portion 44, as depicted in FIG. 9. As shown in FIG. 9, the one way roller clutch 56, the pawl supporting member 54 and the end cap member of the hub shell 44 are in a first position relative to one another. Hence, when electric power is provided to the motor 48, the power transmitting member 52, the pawl supporting member 54, the one way roller clutch assembly 56, the hub shell end portion 44 and the hub shell 42 all rotate together. Correspondingly, as shown in FIG. 13 the pawls 78 of the pawl supporting member 54 are retained in the dis-engaged position (decoupled or inactive position) by contact with the cam projection 130 of the one way roller clutch assembly 56. FIGS. 9 and 13 show differing sections of the one way roller clutch 56, the pawl supporting member 54 and the end cap member of the hub shell 44. However, in both FIGS. 9 and 13, the one way roller clutch 56, the pawl supporting member 54 and the end cap member of the hub shell 44 are in a first position relative to one another.

Figure 10:
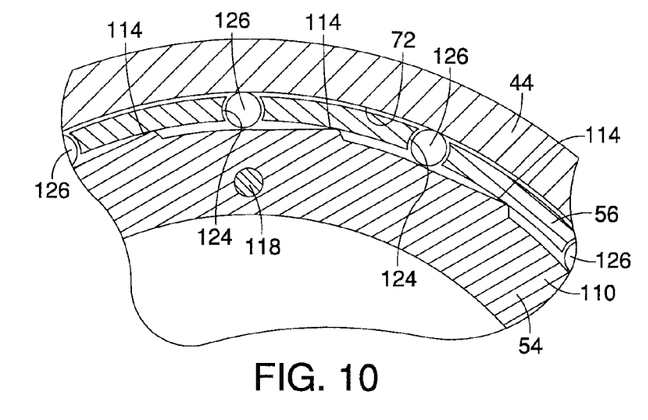
FIG. 10 is a cross-sectional view similar to FIG. 9, showing the section of the one way roller clutch, the section of the pawl supporting member and the section of the end cap member of the hub shell in a second position relative to one another, showing the one way roller clutch in a dis-engaged position in accordance with first embodiment.
Figure 14:
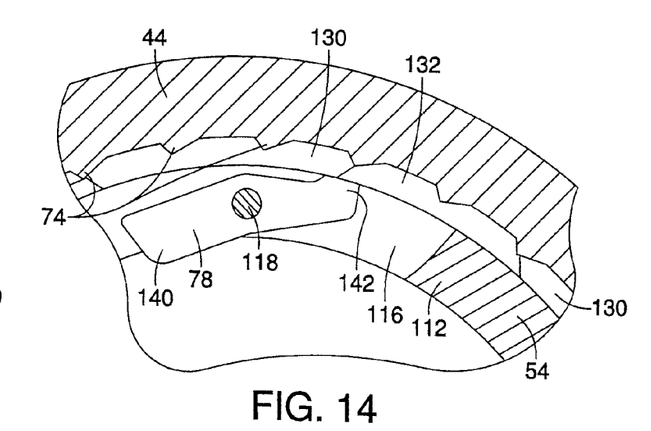
FIG. 14 is a cross-sectional view similar to FIG. 13, showing the another section of the end cap member of the hub shell, the another section of the one way roller clutch, and the another section of the pawl supporting member in the second position relative to one another corresponding to the relative positions depicted in FIG. 10, showing the pawl moved to the dis-engaged position by contact with the cam projection of the one way roller clutch in accordance with first embodiment.

When the cyclist on the bicycle 10 stops providing power to the motor 48, the bicycle 10 begins to coast and the wheels 26 and 28 freely rotate. At first, when power is no longer provided to the motor 49, the power transmitting member 52 and the pawl supporting member 54 begin to rotate at a speed that is less than the rotational speed of the hub shell 42, the hub shell end portion 44 and the one way roller clutch assembly 56. As depicted in FIG. 10, the rollers 126 are no longer trapped between the roller clutch engaging surface 72 of the hub shell end portion 44 and the cam surfaces 114 of the pawl supporting member 54. FIGS. 10 and 14 both shows the one way roller clutch 56, the pawl supporting member 54 and the end cap member of the hub shell 44 in a second position relative to one another. In FIG. 14, the pawls 78 of the pawl supporting member 54 are retained in the dis-engaged position by contact with the cam projection 130 of the one way roller clutch assembly 56. However, in FIG. 14, the pawls 78 begin to move toward the recesses 132.

Figure 11:
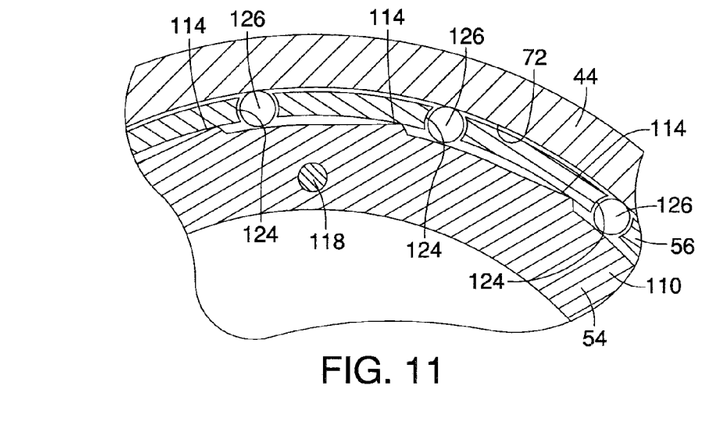
FIG. 11 is a cross-sectional view similar to FIGS. 9 and 10, showing the section of the one way roller clutch, the section of the pawl supporting member and the section of the end cap member of the hub shell in a third position relative to one another, showing the one way roller clutch in a dis-engaged position in accordance with first embodiment.
Figure 15:
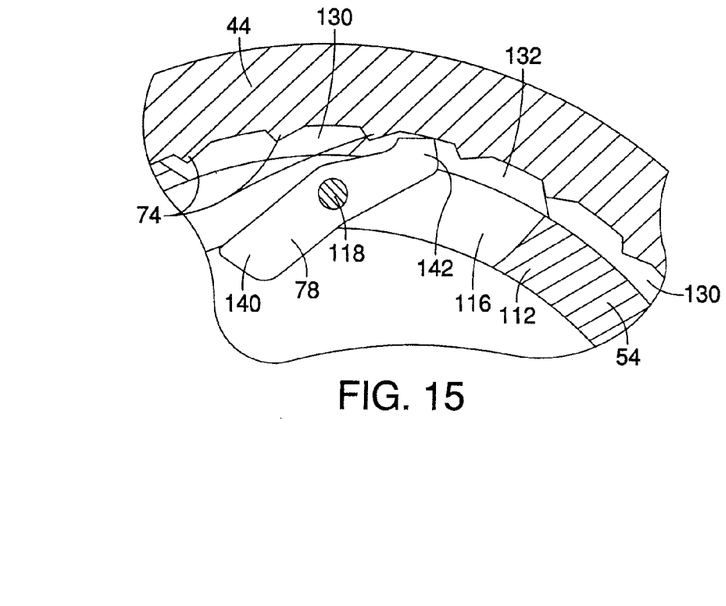
FIG. 15 is a cross-sectional view similar to FIGS. 13 and 14, showing the another section of the end cap member of the hub shell, the another section of the one way roller clutch, and the another section of the pawl supporting member in the third position relative to one another corresponding to the relative positions depicted in FIG. 11, showing the pawl moved to the engaged position as a result of movement into the recess of the one way roller clutch in accordance with first embodiment.

Subsequently, as depicted in FIG. 11, the rollers 126 are completely free of the roller clutch engaging surface 72 of the hub shell end portion 44 and the cam surfaces 114 of the pawl supporting member 54. FIGS. 11 and 15 both show the one way roller clutch 56, the pawl supporting member 54 and the end cap member of the hub shell 44 in a third position relative to one another. In FIG. 15, the pawls 78 of the pawl supporting member 54 are able to move into the engaged position because the locking end 142 of the pawl 78 has pivoted into the recess 132 being free of the cam projection 130 of the one way roller clutch assembly 56.

Figure 12:
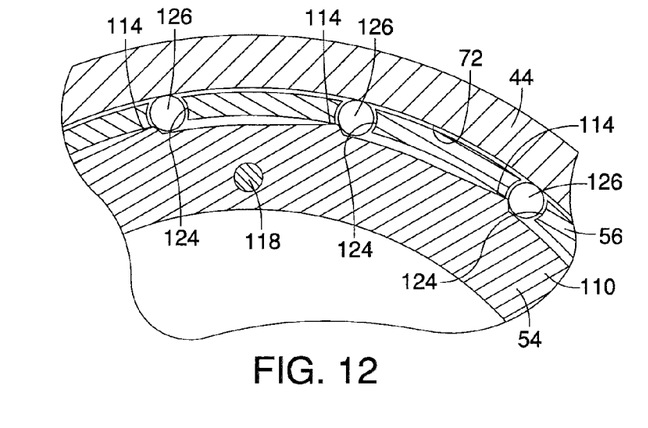
FIG. 12 is a cross-sectional view similar to FIGS. 9, 10 and 11, showing the section of the one way roller clutch, the section of the pawl supporting member and the section of the end cap member of the hub shell in a fourth position relative to one another, showing the one way roller clutch in a dis-engaged position in accordance with first embodiment.
Figure 16:
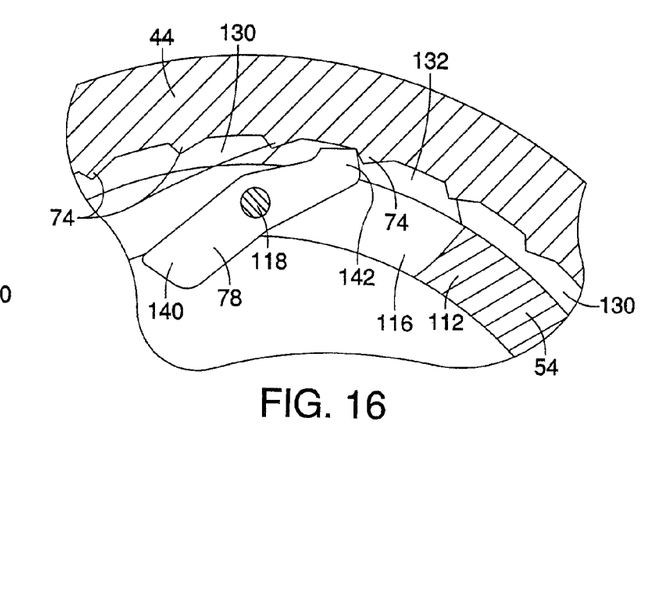
FIG. 16 is a cross-sectional view similar to FIGS. 13, 14 and 15, showing the another section of the end cap member of the hub shell, the another section of the one way roller clutch, and the another section of the pawl supporting member in the fourth position relative to one another corresponding to the relative positions depicted in FIG. 12, showing the pawl moved to the engaged position as a result of movement into the recess of the one way roller clutch and the pawl further contacting one of a plurality of ratchet teeth 74 on the end cap member of the hub shell thus enabling the regeneration function in accordance with first embodiment.

As the one way roller clutch 56, the pawl supporting member 54 and the end cap member of the hub shell 44 continue to move relative to one another, they eventually achieve the fourth position depicted in FIGS. 12 and 16. In FIG. 12, the rollers 126 contact edges of the cam surfaces 114, but are not trapped against the roller clutch engaging surface 72. Further, as shown in FIG. 16, the locking end 142 of the pawl 78 engages one of the ratchet teeth 74 on the inner surface of the hub shell end portion 44 (a coupled or active position). Once the locking end 142 of the pawl 78 engages the ratchet teeth 74 on the inner surface of the hub shell end portion 44, rotation of the front wheel 26 causes continuing rotation of the rotor section 94 relative to the stator section 92 of the motor 48. Hence, with the pawl supporting member 54 and the end cap member of the hub shell 44 in the fourth position depicted in FIGS. 12 and 16, the regeneration function proceeds. Specifically, rotation of the front wheel 26 causes the motor 48 to serve as an electric generator providing electric power to re-charge the battery 22.

However, when the pawl control member 58 is moved from the regeneration ON position depicted in FIGS. 4 and 5 (in solid lines) to the regeneration OFF position depicted in FIGS. 3 and 5 (in dashed lines), the pawls 78 are restricted against movement of the locking end 142 into engagement with the ratchet teeth 74. In other words, when the pawl control member 58 is in the regeneration ON position shown in FIG. 4, the cam surface 150 of the pawl control member 58 is pulled away from the control end 140 of the pawls 78. Hence, the locking end 142 of each of the pawls 78 is free to engage a corresponding one of the ratchet teeth 74. The regeneration function is possible with the pawl control member 58 is moved from the regeneration ON position. However, when the pawl control member 58 is in the regeneration OFF position shown in FIG. 3, the cam surface 150 of the pawl control member 58 contacts the control end 140 of the pawls 78 preventing the locking end 142 from engaging the ratchet teeth 74. The regeneration function is not possible with the pawl control member 58 is moved from the regeneration OFF position.

Thus, a cyclist can operate a corresponding one of the control levers 36 to enable the regeneration function or dis-enable the regeneration function. For example, if the cyclist is coasting on a level surface and wants to maximize the coasting distance, the cyclist can dis-enable the regeneration function so that the motor 48 operating as an electric generator cannot apply any drag on the coasting bicycle 10. However, if the cyclist is coasting on a downhill slope, the cyclist may want to enable the regeneration function in order to re-charge the battery 22.

More specifically, the pawl supporting member 54 has at least one pawl 78 that is selectively movable between the active position where the pawl 78 allows transmission of rotary power from the hub shell 42 to the power transmitting member 52 and the inactive position decoupling the pawl 78 from one of the power transmitting member 52 and the hub shell 42.

Second Embodiment

Figure 17:
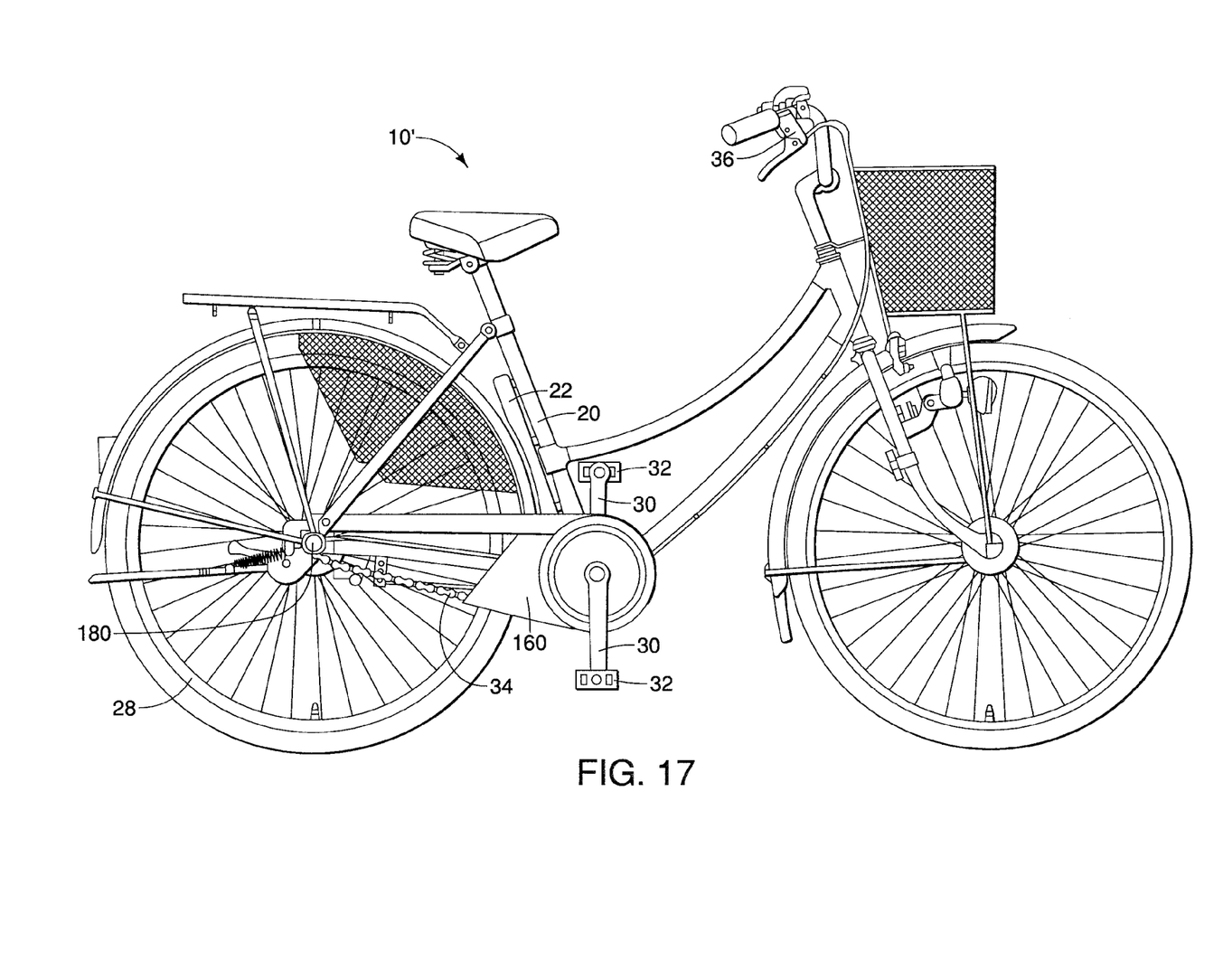
FIG. 17 is a side elevational view of a bicycle that includes an electric motor and a bicycle hub assembly in accordance with a second embodiment.
Figure 18:
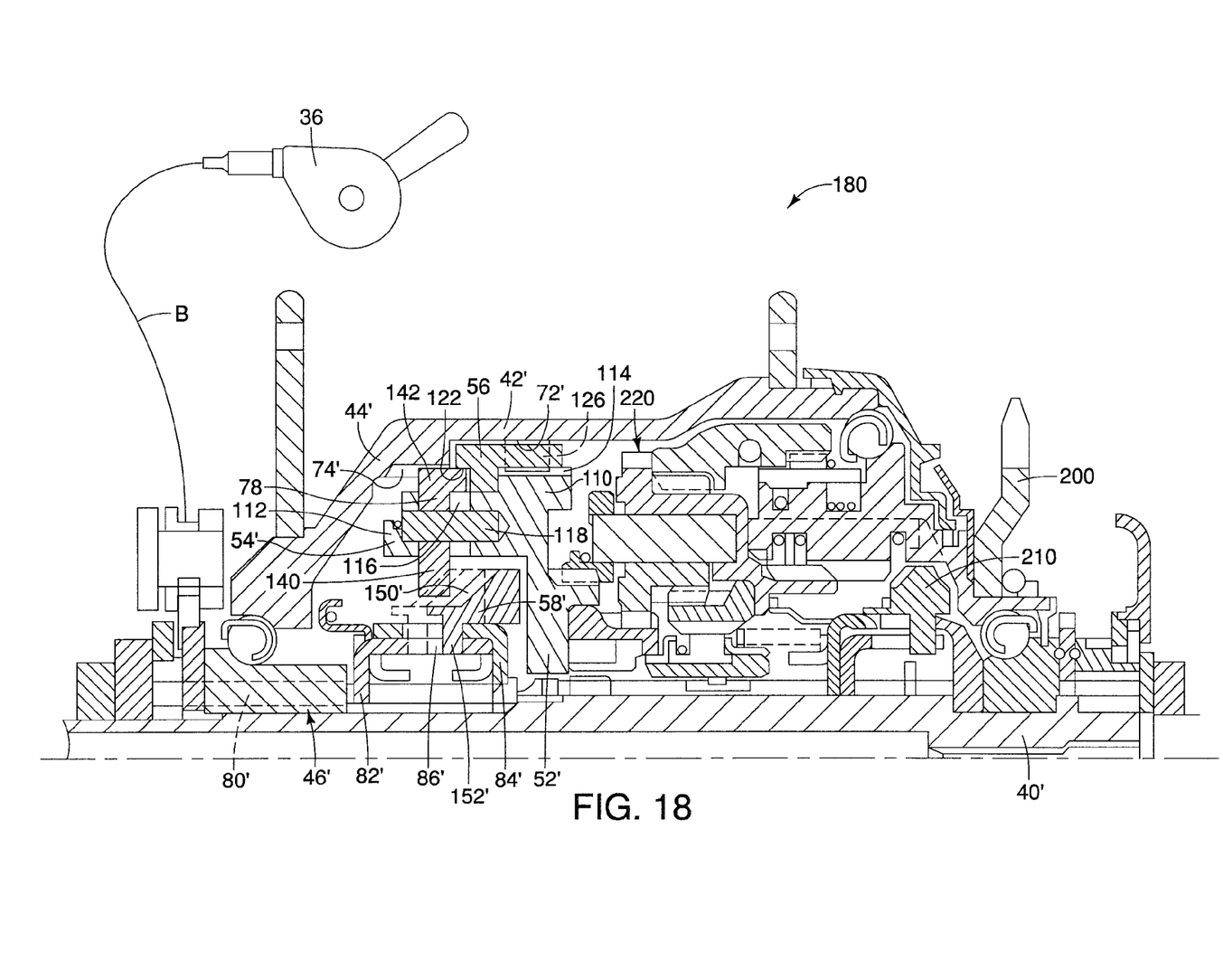
FIG. 18 is a cross-sectional view of the bicycle hub assembly of a rear wheel showing a power transmission assembly, a power transmitting member, a pawl supporting member, a one way roller clutch and a hub shell in accordance with the second embodiment.

Referring now to FIGS. 17 and 18 a bicycle 10' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the bicycle 10' basically includes many of the features of the first embodiment, such as the frame 20, the battery 22, the rear wheel 28, the crank anus 30 with the pedals 32, the chain 34 and the control levers 36. However, in the second embodiment, the bicycle 10' also includes a motor 160 that is operably coupled to the chain 34 in a conventional manner. Since the motor 160 is a conventional mechanism, further description is omitted for the sake of brevity.

The bicycle 10' also includes a hub assembly 180, as best shown in FIG. 18. The hub assembly 180 is disposed at a center of the rear wheel 28. As mentioned above, the bicycle 10 includes the motor 160. The motor 160 provides motor assist rotary power for moving the bicycle 10. Specifically, as the cyclist pedals the bicycle 10 using the pedals 32, the motor 160 provides supplemental rotary power via the chain 34 to the hub assembly 180.

The hub assembly 180 basically includes a chain sprocket 200, a clutch assembly 210 and a power transmission assembly 220. The chain 34 is engaged with the chain sprocket 200 in a conventional manner. Since the chain sprocket 200, the clutch assembly 210 and the power transmission assembly 220 are conventional elements of a hub assembly, description is omitted for the sake of brevity.

The power transmission assembly 220 includes a power transmitting member 52' that provides rotary power to a pawl supporting member 54'.

The hub assembly 180 also includes a hub shell 42' that includes a hub shell end portion 44', an operating mechanism 46', the pawl supporting member 54', the one way roller clutch assembly 56 and a pawl control member 58'.

The hub shell 42' is unitarily formed with the hub shell end portion 44'. The hub shell 42' and/or the hub shell end portion 44' includes a roller clutch engaging surface 72' and ratchet teeth 74'. The roller clutch engaging surface 72' serves the same purpose as the roller clutch engaging surface 72 of the hub assembly 12 of the first embodiment. Specifically, the roller clutch engaging surface 72' are aligned with the rollers 126 of the one way roller clutch assembly 56 for engagement with the rollers 126. The ratchet teeth 74' serve the same purpose as the ratchet teeth 74 of the hub assembly 12 of the first embodiment. Specifically, the ratchet teeth 74' are dimensioned for engagement with the pawls 78 of the pawl supporting member 54'.

The operating mechanism 46' is dimensioned differently that the operating mechanism 46 of the hub assembly 12 of the first embodiment, but serves the same function and operation as the operating mechanism 46 of the hub assembly 12 of the first embodiment. Specifically, the operating mechanism 46' includes a sleeve member 80', a control member 82' and a cam member 84' with a cam surface 86'. The sleeve member 80', the control member 82', the cam member 84' and the cam surface 86' operate and function in a manner that is the same as the sleeve member 80, the control member 82, the cam member 84 and the cam surface 86 of the hub assembly 12 of the first embodiment. Therefore, further description is omitted for the sake of brevity.

The pawl supporting member 54' is dimensioned to fit into the hub assembly 180 but has the same features and operation as the pawl supporting member 54 of the hub assembly 12 of the first embodiment. Specifically, the pawl supporting member 54' includes the cam section 110 with cam surfaces 114, the pawl support section 112 with recesses 116, the pivot shafts 118 and the pawls 78 with control ends 140 and locking ends 142. Since these features operate and function in the same manner as in the hub assembly 12, further description is omitted for the sake of brevity.

The one way roller clutch assembly 56 is the same as described above with respect to the hub assembly 12. For example, the one way roller clutch assembly includes the roller support section 120, the rollers 126 and the cam section 122. Therefore, description is omitted for the sake of brevity.

The pawl control member 58' is dimensioned differently that the pawl control member 58 of the hub assembly 12 in order to fit in the hub assembly 180. However, function and operation of the pawl control member 58' are identical to the pawl control member 58 of the hub assembly 12. Specifically, the pawl control member 58' includes a cam surface 150' and a plurality of radially inwardly extending projection 152'. The cam surface 150' and the plurality of radially inwardly extending projection 152° serve the same function and operation as the cam surface 150 and the plurality of radially inwardly extending projections 152 of the hub assembly 12 of the first embodiment. Therefore, description is omitted for the sake of brevity.

In the hub assembly 180, the chain sprocket 200 is installed for rotational movement about the fixed hub shaft 40'. Further, the chain sprocket 200 is coupled to the power transmitting member 52' via the power transmission assembly 220 for transmission of rotary power therebetween.

Hence, in the second embodiment, a cyclist can selectively move the position of the pawl control member 58' between an active state and an inactive state. By controlling the position of the pawl control member 58', the cyclist can selectively use the regeneration function for regenerative braking (and battery recharging) or allow the bicycle 10' to freely coast with no drag from the motor 160.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle hub assembly. Accordingly, these terms, as utilized to describe the bicycle hub assembly should be interpreted relative to a bicycle equipped with the bicycle hub assembly as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub assembly comprising:
    a fixed hub shaft;
    a hub shell operably coupled to the fixed hub shaft for rotation about the fixed hub shaft;
    a power transmitting member disposed within the hub shell;
    a pawl supporting member having at least one pawl member selectively movable between an active position where the pawl member transmits rotary power from the hub shell to the power transmitting member and an inactive position decoupling the pawl from one of the power transmitting member and the hub shell; and
    a one way roller clutch assembly coupled between the power transmitting member and the hub shell movable between an active position where the roller clutch assembly couples the power transmitting member to the hub shell transmitting rotary power from the power transmitting member to the hub shell and an inactive position decoupling the power transmitting member from the hub shell.

2. The bicycle hub assembly according to claim 1, wherein the power transmission member is connected to the pawl supporting member for rotation therewith.

3. The bicycle hub assembly according to claim 2, wherein an annular section of the pawl supporting member extends within an annular portion of the roller clutch assembly.

4. The bicycle hub assembly according to claim 1, wherein the roller clutch assembly includes an annular ring member supporting a plurality of roller clutch elements.

5. The bicycle hub assembly according to claim 4, wherein the roller clutch elements are disposed between a portion of the hub shell and a portion of the pawl supporting member.

6. The bicycle hub assembly according to claim 1, further comprising
    a pawl control member that is selectively movable between a pawl engagement position and a pawl release position.

7. The bicycle hub assembly according to claim 6, wherein the pawl control member includes a cam surface dimensioned for selective contact with a portion of the pawl.

8. The bicycle hub assembly according to claim 6, wherein the pawl control member is movable in an axial direction of the fixed hub shaft.

9. The bicycle hub assembly according to claim 6, wherein the pawl control member includes a remote positioning mechanism.

10. The bicycle hub assembly according to claim 1, further comprising
    an electric motor operably coupled to the power transmitting member to provide rotary power.

11. The bicycle hub assembly according to claim 1, further comprising
    a chain sprocket installed for rotational movement about the fixed hub shaft, the chain sprocket being coupled to the power transmitting member for transmission of rotary power therebetween.

* * * * *